United States Patent
Kervec et al.

(10) Patent No.: US 8,139,153 B2
(45) Date of Patent: Mar. 20, 2012

(54) METHOD FOR GENERATING DISTANCES REPRESENTATIVE OF THE EDGE ORIENTATIONS IN A VIDEO PICTURE, CORRESPONDING DEVICE AND USE OF THE METHOD FOR DEINTERLACING OR FORMAT CONVERSION

(75) Inventors: Jonathan Kervec, Paimpont (FR); Pascal Bourdon, Le Grand Fougeray (FR); Nicolas Menard, Concarneau (FR)

(73) Assignee: Thomson Licensing, Boulogne, Billancourt (FR)

( * ) Notice: Subject to any disclaimer, the term of this patent is extended or adjusted under 35 U.S.C. 154(b) by 666 days.

(21) Appl. No.: 12/315,574

(22) Filed: Dec. 4, 2008

(65) Prior Publication Data
US 2009/0207304 A1    Aug. 20, 2009

(30) Foreign Application Priority Data
Dec. 13, 2007    (FR) .................................. 07 59828

(51) Int. Cl.
*H04N 7/01*    (2006.01)
(52) U.S. Cl. ..................... 348/448; 348/452; 348/701
(58) Field of Classification Search .............. 348/448, 348/452, 607, 441, 458, 700–701; 382/199; *H04N 7/01*
See application file for complete search history.

(56) References Cited

U.S. PATENT DOCUMENTS

| | | | | |
|---|---|---|---|---|
| 5,519,451 A * | 5/1996 | Clatanoff et al. | ............. | 348/606 |
| 5,929,918 A * | 7/1999 | Marques Pereira et al. | .. | 348/448 |
| 6,262,773 B1 * | 7/2001 | Westerman | ................... | 348/448 |
| 7,423,691 B2 * | 9/2008 | Orlick et al. | .................. | 348/448 |
| 7,982,798 B2 * | 7/2011 | Adams | ......................... | 348/448 |
| 2007/0236601 A1 | 10/2007 | Hahn et al. | | |

FOREIGN PATENT DOCUMENTS

| | | |
|---|---|---|
| EP | 1 313 312 A | 5/2003 |
| GB | 2 422 264 A | 7/2006 |

OTHER PUBLICATIONS

Search Report, Mar. 7, 2008.

* cited by examiner

*Primary Examiner* — Trang U Tran
(74) *Attorney, Agent, or Firm* — Jeffrey D. Carter

(57) ABSTRACT

The distances representative of the edge orientation at a current points of a video picture generated are particularly used for the deinterlacing or format conversion of video pictures. It can be implemented in a video coder or decoder. According to the invention, the distances representative of the edge orientation calculated are filtered with a conditional median filter applied to a window of p by q distances. This filter only takes into account the distances of points for which the local gradient module of the video components is greater than a threshold.

9 Claims, 3 Drawing Sheets

METHOD FOR GENERATING DISTANCES REPRESENTATIVE OF THE EDGE ORIENTATIONS IN A VIDEO PICTURE, CORRESPONDING DEVICE AND USE OF THE METHOD FOR DEINTERLACING OR FORMAT CONVERSION

This application claims the benefit, under 35 U.S.C. §119, of European Patent Application No. 0759828 filed Dec. 13, 2007.

FIELD OF THE INVENTION

The present invention relates to a method and device for the generation of a distance representative of the edge orientation at a current point of a video picture. The distances generated are particularly used for the deinterlacing or format conversion of video pictures. It can be implemented in a video coder or decoder.

TECHNOLOGICAL BACKGROUND OF THE INVENTION

There are currently two formats associated with standard HDTV (High Definition TV). These two formats are the 720p format and the 1080i format. The 720p format produces progressive pictures comprising 720 lines and 1280 columns and the 1080i format produces interlaced pictures comprising 1080 lines and 1920 columns. Each of these formats has advantages that are specific to it. The 720p format presents a better temporal resolution and reproduces fast moving objects without creating a blur effect while the 1080i format presents a better spatial resolution. The programme broadcasters have chosen to use one or other of these formats but not both together. There is therefore a real necessity to process, prior to display, the format of broadcast programmes, to transform it into a format supported by the display device used to display said programmes.

It is known in the art to change the format of a video picture or to deinterlace it by first carrying out a detection of the local orientation of edges in the input picture then carrying out an interpolation based on the detected orientations. The results of known methods of detection of edge orientations in a video picture are noisy or require a large number of calculations (for example, testing of a large number of possible edge orientations).

SUMMARY OF THE INVENTION

The purpose of the present invention is to improve this method.

The present invention relates to a method for the generation of a distance representative of the edge orientation at a current point of a video picture, comprising a calculation step, of the current point and of a plurality of points of the picture surrounding said current point forming a set of k points centred on the current point, at a distance representative of edge orientation at this point, k being a natural integer greater than 1, the method being remarkable in that it comprises in addition a conditional median filtering step of the calculated distance for the current point, on the set of distances, from among the calculated distances for the points of the set of k points, respecting a predetermined criterion.

According to a particular embodiment, the distance representative of the edge orientation at a point of the video picture is calculated from a local gradient of video components of the video picture at said point.

According to the invention, the distances respecting the predetermined criterion are the distances associated with the points of the set of points whose local gradient of video components at these points is greater than a threshold. The threshold can be fixed or variable. Advantageously, the threshold is variable and, for the current point, this threshold depends on the local gradient module of the video components of the current point. According to a particular embodiment, this threshold is equal to a percentage of the local gradient module of the video components of the current point. This percentage is for example equal to 50%.

The present invention also relates to a device for the generation of a distance representative of the edge orientation at a current point of a video picture, comprising:
  a calculation circuit to calculate, at said current point and at a plurality of points of said picture surrounding said current point forming a set of k points centred on said current point, a distance representative of the edge orientation at said point, k being a natural integer greater than 1,
  a conditional median filter to filter the calculated distance for said current point on a set of distances, among the calculated distances for the points of the set of k points, respecting a predetermined criterion.

According to the invention, the distances respecting the predetermined criterion are the distances of points whose local gradient of video components at said points is greater than a threshold.

The invention also relates to the use of the method of generation of a distance relative to the edge orientation in a video picture deinterlacing method, in which the distance representative of the edge orientation calculated at a current point of the video picture is used to calculate the value of pixels of the deinterlaced picture.

The invention also relates to use of the method of generation of a distance relative to the edge orientation in a method for the format conversion of an input video picture to an output video picture, in which the distance representative of the edge orientation calculated at a video picture current point is used to calculate the value of pixels of the output picture.

BRIEF DESCRIPTION OF THE DRAWINGS

The invention will be better understood upon reading the following description, provided as a non-restrictive example and referring to the annexed drawings wherein.

DETAILED DESCRIPTION OF THE PREFERRED EMBODIMENTS OF THE INVENTION

Figure 1:
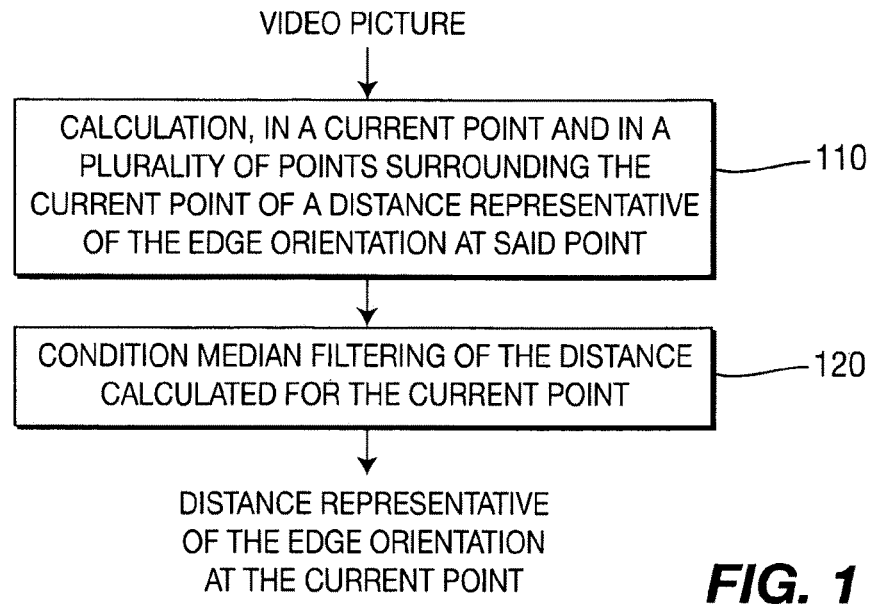
FIG. 1 shows the steps in a first embodiment of the method according to the invention
Figure 2:
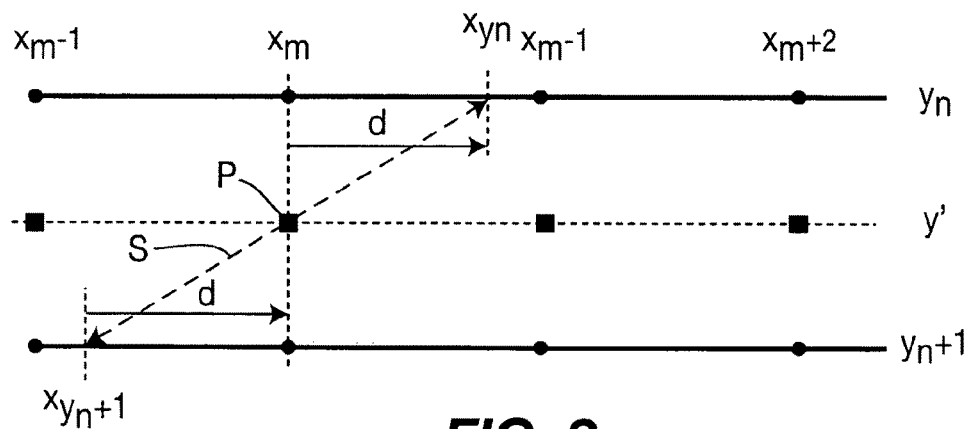
FIG. 2 shows, in the case of a deinterlacing, the position of a point P of the input picture in which it is calculated at a distance representative of the edge orientation.

FIG. 1 shows the steps in a first embodiment of the method according to the invention. The method aims to generate a distance representative of the edge orientation at a current point of a video picture. The method comprises a calculation step 110, at the current point and at a plurality of points of said picture surrounding the current point forming a set of k points centred on the current point, at a distance representative of the edge orientation at the current point, k being a natural integer greater than 1. This set is for example a rectangular window of p by q points centred on the current point, p and q being natural integers greater than 1. In the case of a deinterlacing, the position of the current point of the picture where the distance is calculated corresponds to the position of a pixel of the deinterlaced picture. In the case of a format conversion, the position of the current point of the picture where the distance is calculated corresponds to the position of a pixel of the converted picture An example of the calculation of the representative distance d of a edge orientation at a point of the input picture is provided hereafter in the case of a deinterlacing. This distance d, is calculated at a point P of the input picture as shown in FIG. 2. FIG. 2 shows 8 pixels of the input picture spread over two consecutive lines $y_n$ and $y_n+1$ of the input picture. These pixels belong to the columns of pixels numbered $x_m-1$, $x_m$, $x_m+1$ and $x_m+2$ of the input picture. The pixels of the input picture are represented on the figure by black circles. In this example, the deinterlacing consists in generating a line of pixels $y'=y_n+\frac{1}{2}$ interposed at mid-distance between the lines $y_n$ and $y_n 1+1$. The pixels of this additional line are represented by black squares. The distance is calculated at a point P belonging to the line y' and the column $x_m$. The point P is situated inside the zone delimited by the coordinates $(x_m-1, y_n)$, $(x_m+1, y_n)$, $(x_m+1, y_n+1)$ and $(x_m-1, y_n+1)$. The pixel P is identified by the coordinates $(x_m, y')$ in the input picture. The calculation of the distance d for the pixel P of coordinates $(x_m, y')$ is provided hereafter. For this purpose, a horizontal gradient, noted as $I_x(x_1, y')$, and a vertical gradient, noted as $I_y(x_1, y')$, of the luminance component are calculated at this point P.

$$I_x(x_m, y') = \frac{\partial I}{\partial x}(x_m, y')$$
$$= I(x_m - 1, y_n) + I(x_m - 1, y_n + 1) - I(x_m + 1, y_n) - I(x_m + 1, y_n + 1)$$

$$I_y(x_m, y') = \frac{\partial I}{\partial y}(x_m, y')$$
$$= I(x_m - 1, y_n) + I(x_m + 1, y_n + 1) - I(x_m - 1, y_n + 1) - I(x_m + 1, y_n + 1)$$

where I(x,y) designates the luminance component of the pixel at coordinates (x,y).

The distance d to point P is then taken to equal:

$$d = \frac{I_x(x_m, y')}{I_y(x_m, y')}$$

The distance d calculated for the pixel P is shown in FIG. 2. A line segment S links the point at coordinates $(x'+d, y_n)$ and the point at coordinates $(x'-d, y_n+1)$.

With reference again to FIG. 1, the method of the invention next comprises a step 120 of conditional median filtering of the distances d calculated in step 110. Conditional median filtering is understood to mean a median filtering in which the values taken into account for filtering respect a predetermined criterion. Median filtering is carried out for example on a window of p by q distance values, p and q being natural integers greater than 1. The integers p and q are preferably greater than 3 for the filter to be efficient. For example p=5 and q=5. The filtering is then performed in this case on 25 values. The filtering is centred on the distance d to be filtered. According to the invention, only the values respecting a predetermined criterion are employed for this filtering. The values of the window taken into account for filtering are those for which the associated points have a gradient module local to their video components $\|\nabla I\|$ greater than a threshold S, where $$\|\nabla I\| = \sqrt{\sum_{j=1}^{q} I_{jx}^2 + \sum_{j=1}^{q} I_{jy}^2}.$$

$I_j(x,y)$ designates the value of the colour component j of the pixel at spatial coordinates (x,y) in the picture and q designates the number of video components. In the case of a pixel value expressed in the colour space [Y,Cb,Cr], q is equal to 3 and $I_1$ designates the value of the component Y, $I_2$ designates the value of the component Cb and $I_3$ designates the value of the component Cr.

The threshold S is for example a percentage of the local gradient module of video components of the point considered. This threshold is for example equal to 50%. This threshold can be defined experimentally.

This filtering is illustrated by the following two tables: the first table shows the local gradient modules of the video components $\|\nabla I\|$ of points of a window of 5×5 points centred on a current point (at the centre) and the second table shows the calculated distances for these points:

TABLE 1

| 65 | 60  | 38  | 15  | 20  |
|----|-----|-----|-----|-----|
| 42 | 120 | 90  | 33  | 15  |
| 33 | 80  | 100 | 42  | 21  |
| 25 | 40  | 80  | 100 | 27  |
| 10 | 45  | 60  | 70  | 117 |

TABLE 2

| 10 | 5  | 4 | 3  | 12 |
|----|----|---|----|----|
| 4  | 10 | 6 | 3  | 19 |
| 4  | 5  | 6 | 4  | 2  |
| 3  | 6  | 7 | 10 | 2  |
| 3  | 8  | 6 | 7  | 10 |

If the threshold S is fixed at 50% of the local gradient module of the current point, the gradient values respecting this criterion in the first table are displayed in grey. Likewise, the distance values associated to the points respecting this criterion are displayed in grey in the second table. The conditional medial filtering of the invention consists then in classing the distance values retained in increasing or decreasing order and in selecting the central value (also called the median) of this ordered list as the output value of the filter.

This conditional filtering enables removal from the median filter of distance values indicating an absence of edges, these values being specific to homogenous areas of the input picture and concentration of filtering on the distance values indicating an edge to conserve the effect of noise reduction of the median filter.

As a variant, the threshold S is fixed or does not depend on the local gradient of the current point.

Figure 3A:
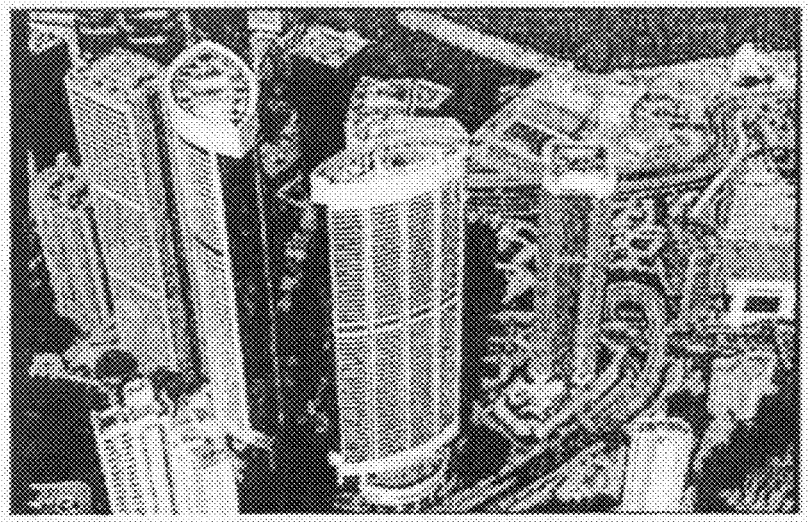
FIGS. 3A to 3C show respectively an original picture, the edge orientation distances calculated for this picture with conditional median filtering in accordance with the invention, and the edge orientation distances calculated for this picture without conditional median filtering.
Figure 3B:
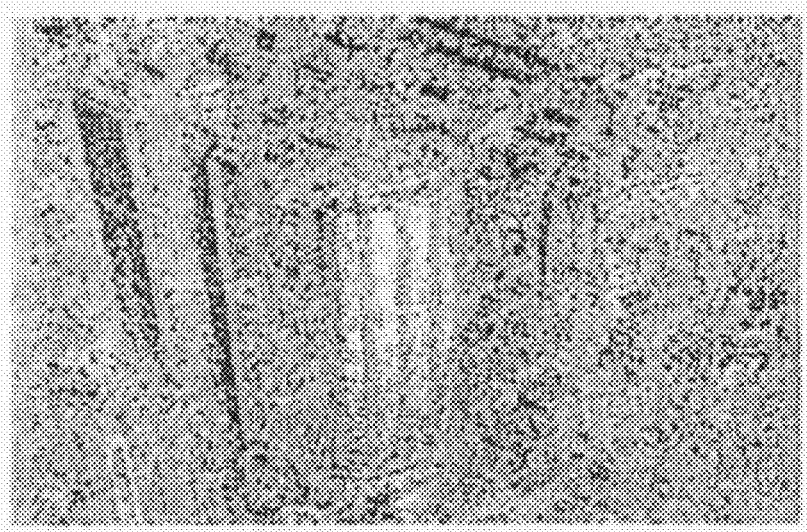
Figure 3C:

FIGS. 3A to 3C are provided as an example to illustrate the results of conditional median filtering (step 120 of the method of the invention). FIG. 3A is an input picture showing skyscrapers in the middle of a city. This picture comprises a large number of edges. FIG. 3B shows the distances representative of the edge orientations in this picture. FIG. 3C shows the distances representative of the edge orientations in this picture after application of a conditional median filter according to the invention. In the FIGS. 3B and 3C, a medium level of grey (128 in the case of coding grey levels on 8 bits) indicates a null distance d (=no edge orientation privileged), a level of grey higher than 128 indicates a positive distance d (=presence of oblique edges oriented towards the top from left to right of the picture) and a level of grey lower than 128 indicates a negative distance d (=presence of oblique edges towards the bottom from left to right of the picture).

As can be seen from these figures, the conditional median filtering of the invention enables many spurious distances to be discarded. The conditional median filtering in accordance with the invention enables the results on the fine edges of objects separating two homogenous areas to be notably improved These filtered distances are used for the interpolation of pixels for format conversion or deinterlacing. Hereafter, the method is used to interpolate a pixel $P_{out}$ at coordinates ($x_{out}$, $y_{out}$) in the output picture (after format conversion or deinterlacing) and coordinates (x',y') in the starting picture. The pixel $P_{out}$ of the output picture thus corresponds to pixel P in the starting picture. v is the ratio of the number of lines of the starting picture to the number of lines of the output picture and r is the ratio of the number of columns of the starting picture to the number of columns of the output picture.

Figure 4:
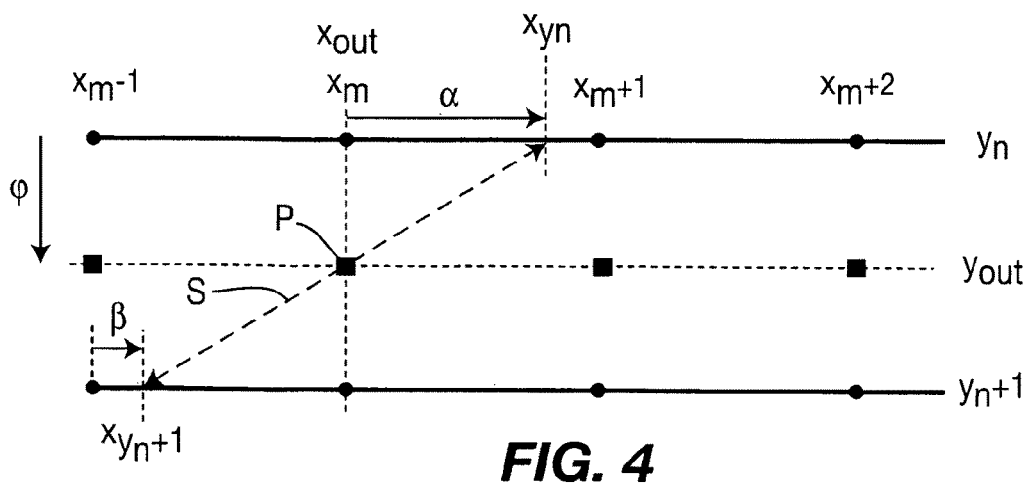
FIG. 4 shows the interpolation of a pixel $P_{out}$ in the case of deinterlacing.

FIG. 4 illustrates the case where the pixel $P_{out}$ is situated on the column $x_m$ and between the lines $y_n$ and $y_n+1$ of the pixels of the starting picture like the pixel P. $P_{out}$ is for example a pixel of a deinterlaced picture. The lines of pixels $y_n$ and $y_n+1$ of the input picture closest to the line $y_{out}$ are determined.

$$y' = v \cdot y_{out}$$

$$y_n = E(y')$$

where E(x) designates the integer part of the variable x.

A vertical phase $\phi = |y' - y_n|$ representing the distance between the line y' of the pixel $P_{out}$ and the line $y_n$ of the starting picture is defined. $\phi$ is comprised between 0 and 1. In the case of deinterlacing, $\phi = \frac{1}{2}$.

So $x_{yn} = x' + 2 \cdot \phi \cdot d$ and $x_{yn+1} = x' + 2 \cdot (1-\phi) \cdot d$, d being calculated for the pixel P at coordinates (x',y').

The value of the pixel $P_{out}$ at coordinates ($x_{out}$, $y_{out}$) in the output picture is then calculated using the following formula that corresponds to a bilinear interpolation:

$$I_{out}(x_{out}, y_{out}) =$$
$$(1-\varphi) \cdot \lfloor (1-\alpha) \cdot I_{in}(E(x_{yn}), y_n) + \alpha \cdot I_{in}(E(x_{yn}) + \text{sgn}(d), y_n) \rfloor +$$
$$\varphi[(1-\beta) \cdot I_{in}(E(x_{yn+1}), y_n+1) + \beta \cdot I_{in}(E(x_{yn+1}) + \text{sgn}(d), y_n+1)]$$

where—$I_{in}(x,y)$ designates the value of the pixel at coordinates (x,y) in the starting picture and $I_{out}(x,y)$ designates the value of the pixel at coordinates (x,y) in the output picture.

sgn(x) is the sign function of x $$\text{sgn}(x) = \begin{cases} -1 & \text{if } x < 0 \\ 0 & \text{if } x = 0 \\ 1 & \text{if } x > 0 \end{cases}$$

the parameters $\alpha$ and $\beta$ are defined as follows:

$$\alpha = |E(x_{yn}) - x_{yn}|$$

$$\beta = |E(x_{yn+1}) - x_{yn+1}|$$

The calculation is carried out on each video component of the pixel. The distance d calculated for the luminance video component is used for the calculation of all the video components of the pixel from the output picture.

Other formulas for the calculation of the video components of pixels of the output picture can be considered. In the example above, the interpolation is bilinear. The use of a linear interpolation or an interpolation by selection of the closest neighbour or a combination of linear or bilinear interpolations can be envisaged. These interpolations are well known by those in the profession. Use of a greater number of lines or columns can also be envisaged. Finally changing the interpolation formula according to the distance module d can be provided for.

Figure 5:
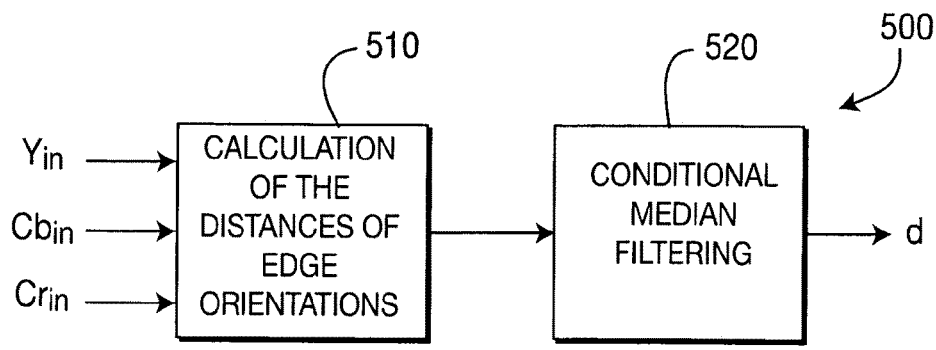
FIG. 5 shows a device capable of implementing the method of FIG. 1.

FIG. 5 illustrates a 500 device capable of implementing the method of the invention. $Y_{in}$, $Cb_{in}$ and $Cr_{in}$ designate the video components of the picture applied at the input of the device. These components are expressed in the colour space [Y,Cb,Cr]. Naturally, other colour spaces can be used. The 500 device comprises:
  a calculation circuit 510 of distances representative of the edge orientations of the input picture, this circuit implements step 110 of the method of the invention, this circuit delivers a distances chart, and
  a conditional median filter 520 implementing step 120 of the method of the invention from the distances chart delivered by the block 510, this filter delivers a filtered distances chart.

Within the context of a format conversion or a deinterlacing, these filtered distances are then processed by an interpolation block.

Figure 6:
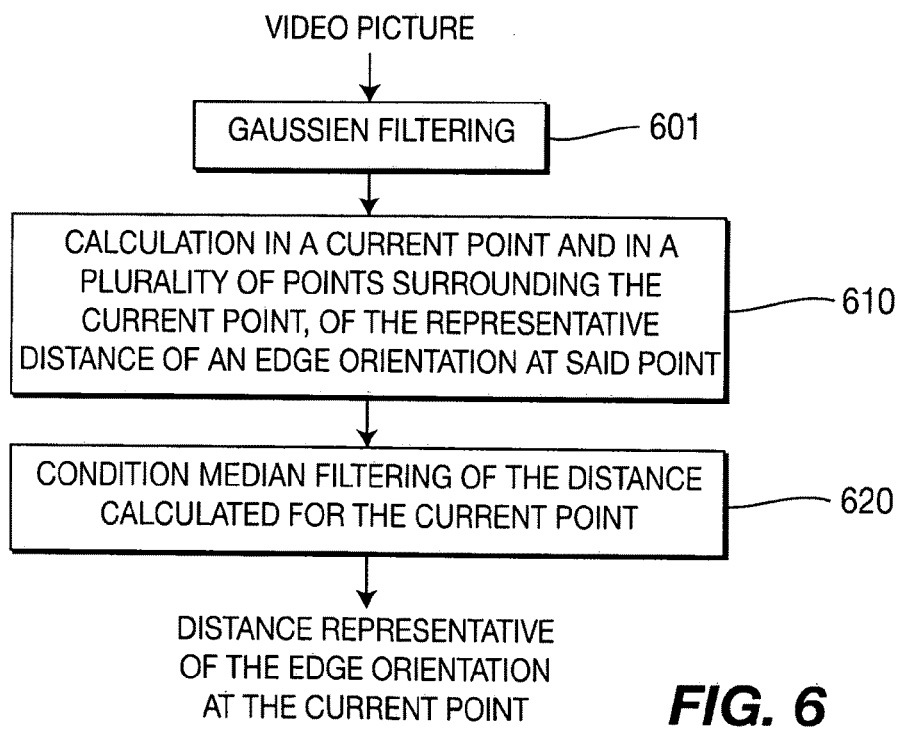
FIG. 6 shows the steps in a second embodiment of the method according to the invention.

FIG. 6 illustrates a second embodiment of the invention. This second embodiment comprises the steps 601, 610 and 620. The steps 610 and 620 are identical to steps 110 and 120 of the first embodiment illustrated by FIG. 1. This second embodiment comprises an additional filtering of the input picture step, with the reference 601. The purpose of this filtering is to improve the calculation of the distances of the edge orientations of the input picture. The filter used is based on a Gaussien kernel. This filter is applied to the component Y of the signal luminance of the input picture or to all the video components of the signal of the input picture. Hereafter, $I_{jf}$ designates the component $I_j$ after filtering. The filtered component is then:

$$I_{jf}(x, y) = G(x, y, \sigma) * I_j(x, y)$$
$$= \int\int_{R^2} G(\mu, \nu, \sigma) \cdot I_j(x-\mu, y-\nu) d\mu d\nu$$

-continued $$\text{where:} \quad G(x, y, \sigma) = \frac{1}{2\pi\sigma} \exp\left(-\frac{(x^2 + y^2)}{2\sigma}\right),$$

$\sigma^2$ is the variance of the Gaussien kernel.

The filter used is for example the following 5×5 coefficients filter:

$$\frac{1}{100} \times [1 \quad 2 \quad 4 \quad 2 \quad 1] \otimes \begin{bmatrix} 1 \\ 2 \\ 4 \\ 2 \\ 1 \end{bmatrix} = \frac{1}{100} \times \begin{bmatrix} 1 & 2 & 4 & 2 & 1 \\ 2 & 4 & 8 & 4 & 2 \\ 4 & 8 & 16 & 8 & 4 \\ 2 & 4 & 8 & 4 & 2 \\ 1 & 2 & 4 & 2 & 1 \end{bmatrix}$$

Figure 7:
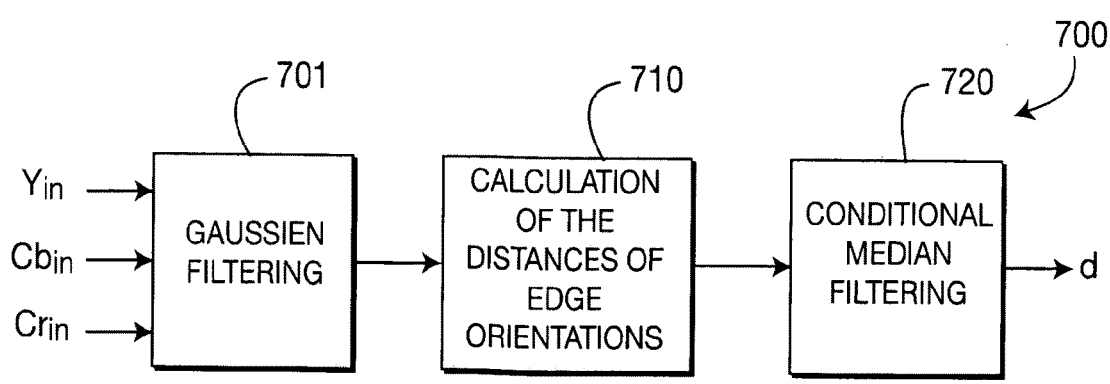
FIG. 7 shows a device capable of implementing the method of FIG. 6.

FIG. 7 illustrates a 700 device capable of implementing this second embodiment of the method of the invention. $Y_{in}$, $Cb_{in}$ and $Cr_{in}$ designate the video components of the picture applied at the input of the device. These components are expressed in the colour space [Y,Cb,Cr]. The 700 device comprises:
- a first filter 701 to implement the first filtering step 601, this filtering is applied to one or to all video components of the signal of the input picture,
- a calculation circuit 710 of distances representative of the edge orientations of the input picture, this circuit implements step 610 of the second embodiment of the method of the invention, this circuit delivers a distances chart, and
- a conditional median filter 720 implementing step 620 of the method of the invention from the distances chart delivered by the block 720, this filter delivers a filtered distances chart.

Within the context of a format conversion or a deinterlacing, these filtered distances are then processed by an interpolation block.

In the method of the invention previously defined, the distance calculated at step 110 or 610 is used as is to determine the pixels of the second set. As a variant, if the distance calculated exceeds a predefined maximum value, this distance is capped at this maximum value. This maximum value is for example equal to 4 pixels for an SD (Standard Definition) picture. In fact, beyond this maximum value, the value of the distance d cannot be low thus introducing errors into the interpolation. According to another variant, if the distance calculated exceeds this maximum value, the distance is adjusted to a null value. This second variant enables even further reduction of the risk of errors while being however less precise in the interpolation of some edges.

Naturally, the invention is not limited to the aforementioned embodiments. Any method or device for format conversion or deinterlacing proposing conditional median filtering on distances of edge orientations used to generate the output picture falls into the field of the present invention.

The invention claimed is:

1. A method, comprising:
   calculating, at a current point of a video picture and at a plurality of points of said video picture surrounding said current point forming a set of k points centered on said current point, distances representative of edge orientations at said points, k being a natural integer greater than one, the distances being calculated from local gradients of video components of said video picture at said points; and
   filtering, via a conditional median filter, the distance calculated for the current point on a set of distances, among the calculated distances for the points of the set of k points, respecting a predetermined criterion, the distances respecting said predetermined criterion being the distances of points whose module of local gradient of video components at said points is greater than a threshold.

2. The method according to claim 1, wherein said threshold is fixed.

3. The method according to claim 1, wherein, for said current point, said threshold depends on the local gradient module of the video components at said current point of the video picture.

4. The method according to claim 3, wherein, for said current point, said threshold is equal to a percentage of the local gradient module of the video components at said current point of the video picture.

5. The method according to claim 4, wherein said percentage is equal to 50%.

6. A device, comprising:
   a calculation circuit operative to calculate, at a current point of a video picture and at a plurality of points of said video picture surrounding said current point forming a set of k points centered on said current point, distances representative of edge orientations at said points, k being a natural integer greater than one, the distances being calculated from local gradients of video components of said video picture at said points; and
   a conditional median filter operative to filter the distance calculated for said current point on a set of distances, among the calculated distances for the points of the set of k points, respecting a predetermined criterion, the distances respecting said predetermined criterion being the distances of points whose module of local gradient of video components at said points is greater than a threshold.

7. The device according to claim 6, wherein, for said current point, said threshold depends on the local gradient module of the video components at said current point of the video picture.

8. A method for de-interlacing a video picture, said method comprising:
   calculating, at a current point of said video picture and at a plurality of points of said video picture surrounding said current point forming a set of k points centered on said current point, distances representative of edge orientations at said points, k being a natural integer greater than one, the distances being calculated from local gradients of video components of said video picture at said points;
   filtering, via a conditional median filter, the distance calculated for said current point on a set of distances, among the calculated distances for the points of the set of k points, respecting a predetermined criterion, the distances respecting said predetermined criterion being the distances of points whose module of local gradient of video components at said points is greater than a threshold; and
   calculating values of pixels of a de-interlaced picture using the distance representative of the edge orientation calculated at said current point of the video picture.

9. A method for converting an input video picture to an output video picture, said method comprising:
   calculating, at a current point of said input video picture and at a plurality of points of said input video picture surrounding said current point forming a set of k points centered on said current point, distances representative of edge orientations at said points, k being a natural integer greater than one, the distances being calculated from local gradients of video components of said input video picture at said points;

filtering, via a conditional median filter, the distance calculated for said current point on a set of distances, among the calculated distances for the points of the set of k points, respecting a predetermined criterion, the distances respecting said predetermined criterion being the distances of points whose module of local gradient of video components at said points is greater than a threshold; and calculating values of pixels of the output video picture using the distance representative of the edge orientation calculated at said current point of the input video picture.

* * * * *